United States Patent
Ohashi

(10) Patent No.: US 6,522,634 B1
(45) Date of Patent: Feb. 18, 2003

(54) WIRELESS TRANSMISSION SYSTEM

(75) Inventor: Tsuyoshi Ohashi, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/385,036

(22) Filed: Aug. 30, 1999

(30) Foreign Application Priority Data

Aug. 31, 1998 (JP) .......................................... 10-245808

(51) Int. Cl.$^7$ ............................ H04M 1/725; H04J 3/00
(52) U.S. Cl. ...................... 370/280; 370/294; 370/322; 455/351; 455/464; 455/466; 455/462
(58) Field of Search ................................ 455/351, 455, 455/462, 464, 426; 370/348, 345, 330, 336, 280, 294, 322, 337

(56) References Cited

U.S. PATENT DOCUMENTS

| | | | | |
|---|---|---|---|---|
| 5,640,395 A | * | 6/1997 | Hamalainen et al. | ....... 370/322 |
| 5,995,844 A | * | 11/1999 | Fukuda | ....................... 455/403 |
| 6,023,621 A | * | 2/2000 | Jackson et al. | ............. 370/310 |
| 6,424,645 B1 | * | 7/2002 | Kawabata et al. | .......... 370/322 |

* cited by examiner

Primary Examiner—Dwayne Bost
Assistant Examiner—Yuwen Pan
(74) Attorney, Agent, or Firm—Oliff & Berridge, PLC

(57) ABSTRACT

When a main device 1 detects an incoming message, the main device 1 transmits a call frame to auxiliary devices 2, 3 during a first time slot of a first cycle. In succession with this, the auxiliary-device 2 transmits a ready frame in a slot 2 to notify main devices of other systems that the communication channel is being used. Neither of the auxiliary devices 2, 3 respond in the third time slot. The same transmission and reception processes are performed in the second cycle. However, afterward in the third cycle, the auxiliary device 2 is brought into an off-hook condition and so transmits an off-hook frame during the third time slot of the third cycle. The main device 1 receives the off-hook frame and transmits a connect frame in the first time slot of the fourth cycle to the auxiliary device 2. In response, the auxiliary device 2 starts communication. With this configuration, data can be transmitted and received with respect to a plurality of auxiliary devices quickly, mixing signals with other systems can be prevented, and connection will be reliably performed.

16 Claims, 7 Drawing Sheets

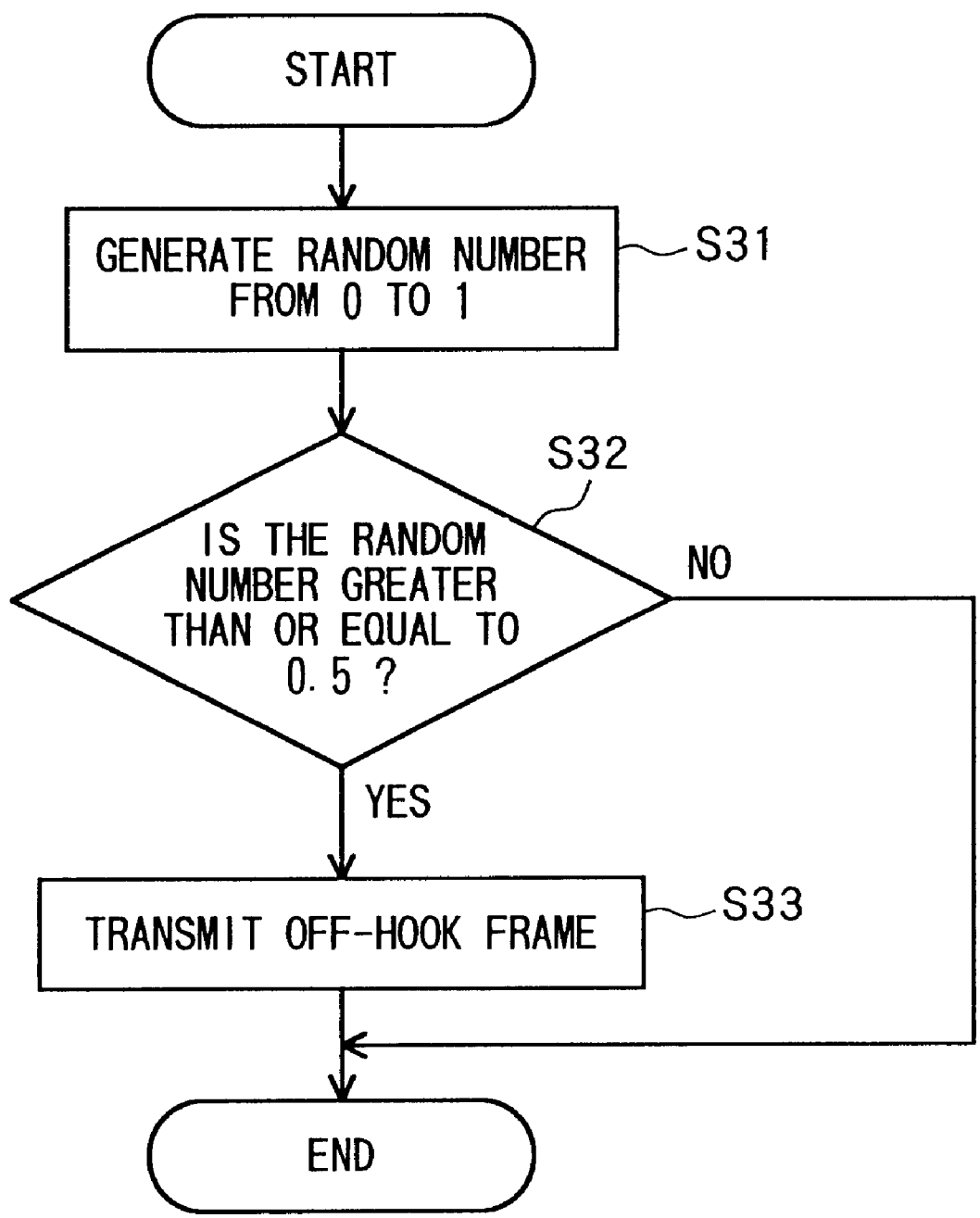

WIRELESS TRANSMISSION SYSTEM

BACKGROUND OF THE INVENTION

1. Field of the Invention

The present invention relates to a wireless transmission system, such as an analog cordless telephone system, wherein a main device and one or more auxiliary devices communicate with each other by wireless transmission using multiple access.

2. Description of the Related Art

Analog cordless telephone systems have recently become popular. An analog cordless telephone system includes a main device, which is connected to a telephone line, and a plurality of auxiliary devices.

Using multiple access technology, wherein the main device and the auxiliary device share a call channel to communicate with each other, a free call channel is selected from a plurality of call channels. An outgoing frequency of the free call channel is used for transmission from the main device to the auxiliary devices and an incoming frequency of the free call channel is used for transmission from the auxiliary devices to the main device. Full duplex mode is used to communicate frequency modulated (FM) audio signals of a telephone call over the pair of call channels between the main and auxiliary devices.

On the other hand, half duplex mode is normally used to communicate a variety of data between the main and auxiliary devices before the telephone call, by modulating the call channel in frame-length time slots using minimum shift keying (MSK). That is, when the main device receives an incoming call, the main device first calls all of the auxiliary devices in order over the selected transmission channel before the actual telephone call is connected. The auxiliary devices ring as a result. Once a user picks up one of the ringing auxiliary devices, that is, brings the auxiliary device into an off-hook situation, the auxiliary device transmits a response at this timing to the main device. Accordingly, the main device sends a connection command to the auxiliary device, and starts the telephone call using the auxiliary device.

SUMMARY OF THE INVENTION

However, when a great number of auxiliary devices are registered in the cordless telephone system, then a great deal of time is required for the main device to call all the auxiliary devices one at a time in order. For this reason, a great deal of time may elapse from when a auxiliary device goes into an off-hook situation, until the main device sends the connection command. For example, if the user picks up the auxiliary device, so that the auxiliary device goes into an off-hook condition immediately after the auxiliary device was called by the main device, then the user must wait for the main device to call all of the other auxiliary devices, one at a time in order, before the auxiliary device responds to the call, whereupon the main device issues a connection command, and the telephone call actually starts. The total time required for connection increases. The response time from when the phone is picked up until start of the telephone conversation is delayed, which makes the telephone system difficult to use.

It is an objective of the present invention to provide a wireless transmission system with a main device that calls a plurality of auxiliary devices over a call channel before a telephone call is started, wherein the system is capable of quickly starting telephone conversations even when the system includes a great number of auxiliary devices, and is capable of preventing signals from different devices from mixing when communication is performed using a multiple access scheme.

To achieve the above-described objectives, a wireless transmission system according to the present invention includes a main device and a plurality of auxiliary devices that communicate data therebetween using a multiple access transmission scheme. The main device transmits to the plurality of auxiliary devices over an outgoing frequency of a single wireless channel. The plurality of auxiliary devices transmit to the main device over an incoming frequency of the single wireless channel.

The main device and the plurality of auxiliary devices communicate in time slots that repeat in cycles. That is, each cycle includes first through third time slots. The first time slot is allotted for the main device to transmit a call signal to the plurality of auxiliary devices. The second time slot is allotted for at least one of the plurality of auxiliary devices to transmit a notification signal notifying that the single wireless channel is presently being used. The third time slot is allotted for any of the plurality of auxiliary devices to transmit a response signal requesting a response from the main device.

With this configuration, when a main device receives an incoming call, it transmits a call signal to the plurality of auxiliary devices using the first time slot. Also, in each cycle, one or more of the auxiliary devices transmit the notification signal using a second time slot. Further, when a auxiliary device is brought into an off-hook condition, it transmits a response signal to the main device in the third time slot.

All of the devices, that is, the main device and the auxiliary devices, transmit and receive information using the three time slots in a repeating cyclical configuration. As a result, even if the number of the auxiliary devices increases, each cycle will still only have a single second time slot and a single third time slot. Since the time required to contact all of the auxiliary devices does not increase, the time from when the main device calls the auxiliary devices until when the auxiliary device responds will remain short.

Because one or more of the auxiliary devices transmit the notification signal using a second time slot, the main device of other systems, for example other cordless telephone systems, can be notified that it should not attempt to use the wireless channel presently being used by the present system. Interference between transmissions of different systems can be prevented.

It is desirable that all of the plurality of auxiliary devices transmit the notification signal in the second time slot of each cycle, because the main device of other cordless telephone systems can be even more reliably notified that the particular wireless channel used by the present system is being used.

It is also desirable that the main device transmit the call signal with designation data that designates which of the auxiliary devices should transmit the notification signal. In this case it is desirable that each auxiliary device include a distinguishing unit that determines whether the designation data designates the corresponding auxiliary device or not. With this configuration, when the main device calls the plurality of auxiliary devices, the main device transmits a call signal to all of the auxiliary devices in a first time slot and, by using designation data included in the call signal, simultaneously designates the auxiliary device that should transmit the notification signal. Each auxiliary device that receives the call signal determines whether the designation data indicates itself, that is, the auxiliary device itself, or not. Accordingly, the most suitable auxiliary device, that is, according to the operating conditions of the auxiliary devices, can be flexibly designated for transmitting the notification signal.

It is also desirable that at least one of the plurality of auxiliary devices transmits the notification signal with distinguishing data that indicates which auxiliary device is transmitting the notification signal. In this case, it is desirable that the main device include a distinguishing unit that determines which auxiliary device is indicated by the distinguishing data.

With this configuration, the auxiliary device that should transmit the notification signal transmits distinguishing data in the notification signal in order to indicate itself as the device that is transmitting the notification signal. Upon receiving the notification signal, the main device determines which auxiliary device transmitted the notification signal based on the distinguishing data. Accordingly, the main device can determine whether the auxiliary device is properly transmitting the notification signal and also grasp the operating conditions of the auxiliary device.

It is desirable that one or more of the auxiliary devices transmit, in each second time slot, the notification signal in the form of an unmodulated carrier corresponding to the incoming frequency of the single wireless channel. With this configuration, the auxiliary device or devices that should send the notification signal transmits a non-modulated carrier having the incoming frequency. Accordingly, the auxiliary device or devices need not generate data or perform processes required for modulation, and so can quickly and easily transmit a notification signal.

It is desirable that the plurality of auxiliary devices each be set with a different retry number that indicates a number of consecutive cycles during which the corresponding auxiliary device should try to retransmit the response signal in the third time slot.

With this configuration, when the main device calls a plurality of auxiliary devices, any auxiliary device that requires a response transmits a response signal in the third time slot. If the auxiliary device does not receive permission to connect from the main device, then the auxiliary device again transmits the response signal in the third time slot. The auxiliary device repeatedly transmits the response signal until either a response is received from the main device or the auxiliary device sends the response signal in a number of consecutive cycles corresponding to the retry number.

Accordingly, even if two or more of the auxiliary devices start transmitting their response signals at the same timing, so that transmission of response signals collide, after one auxiliary device completes its predetermined number of retries, another auxiliary device will still be able to transmit a response signal. As a result, at least one of the auxiliary devices will be able to transmit a response signal so that the auxiliary device can quickly and reliably start telephone communication.

It is desirable that each auxiliary device includes a retry determination unit that determines, based on a predetermined probability, whether to retry transmitting a response signal. In this case, only when a retry determination unit of one of the auxiliary devices determines to retry transmitting the response signal, will that auxiliary device retransmit the response signal in the third time slot subsequent to the third time slit wherein the response signal was first transmitted.

With this configuration, even if two or more auxiliary devices start transmitting their response signals at the same timing, so that the transmissions collide with each other, as soon as one determines to retransmit and the other determines not to retransmit based on the probability, then only one auxiliary device will transmit its response signal at that timing. As a result, a request for response can be properly and quickly transmitted to the main device. One auxiliary device can transmit a response signal in a relatively short time, so that auxiliary device can reliably and even more rapidly start communication.

It is desirable that the wireless transmission system be a cordless transmission system connected to a telephone line. With this configuration, in a cordless telephone system, the main device receives and transmits data to auxiliary devices when, for example, an incoming call is received over the telephone line. Accordingly, the auxiliary devices of the cordless telephone system will not mix signals with devices of other systems, so that connection of incoming telephone calls can be quickly performed.

According to another aspect of the present invention, a wireless transmission system includes a main device, plurality of auxiliary devices, and a timing controller. The main device and the plurality of auxiliary devices communicating data use a multiple access transmission scheme. The main device transmits to the plurality of auxiliary devices over an outgoing frequency of a single wireless channel. The plurality of auxiliary devices transmit to the main device over an incoming frequency of the single wireless channel.

The timing controller controls the main device and the plurality of auxiliary devices to communicate using multiple access based on repeating time-slot cycles. In each time-slot cycle, the timing controller controls the main device to transmit a call signal to the plurality of auxiliary devices in a first time slot; at least one of the plurality of auxiliary devices to transmit in a second time slot a notification signal notifying that the single wireless channel is presently being used; and any of the plurality of auxiliary devices that are in an off-hook condition to transmit in a third time slot an off-hook signal to the main device.

According to another aspect of the present invention, a wireless transmission system includes a main device, a plurality of auxiliary devices, and a multiple access synchronizer. The multiple access synchronizer synchronizes communication of data between the main device and the plurality of auxiliary devices using a multiple access transmission scheme wherein data is exchanged in fixed-width time slots during repeating time-slot cycles. The multiple access synchronizer allots in each time-slot cycle: a first time slot to the main device for transmitting signals to the plurality of auxiliary devices over an outgoing frequency of a single wireless channel; a second time slot to at least one of the plurality of auxiliary devices for transmitting a notification signal notifying that the single wireless channel is presently being used; and a third time slot to the plurality of auxiliary devices for transmitting signals to the main device over an incoming frequency of the single wireless channel.

BRIEF DESCRIPTION OF THE DRAWINGS

The above and other objects, features and advantages of the invention will become more apparent from reading the following description of the preferred embodiment taken in connection with the accompanying drawings in which:

FIG. 8 is a flowchart representing a routine for determining whether to retransmit a data frame, based on probability.

DETAILED DESCRIPTION OF THE PREFERRED EMBODIMENT

A wireless transmission system according to the embodiment of the present invention will be described while referring to the accompanying drawings. In the embodiment, the present invention is applied to an analog cordless telephone system. The analog cordless telephone system includes a main device 1 and a plurality of auxiliary devices 2, 3, which communicate over 250 MHz and 380 MHz frequency bands. Data is transmitted and received in half duplex mode, and audio signals are transmitted and received in full duplex mode.

Figure 1:
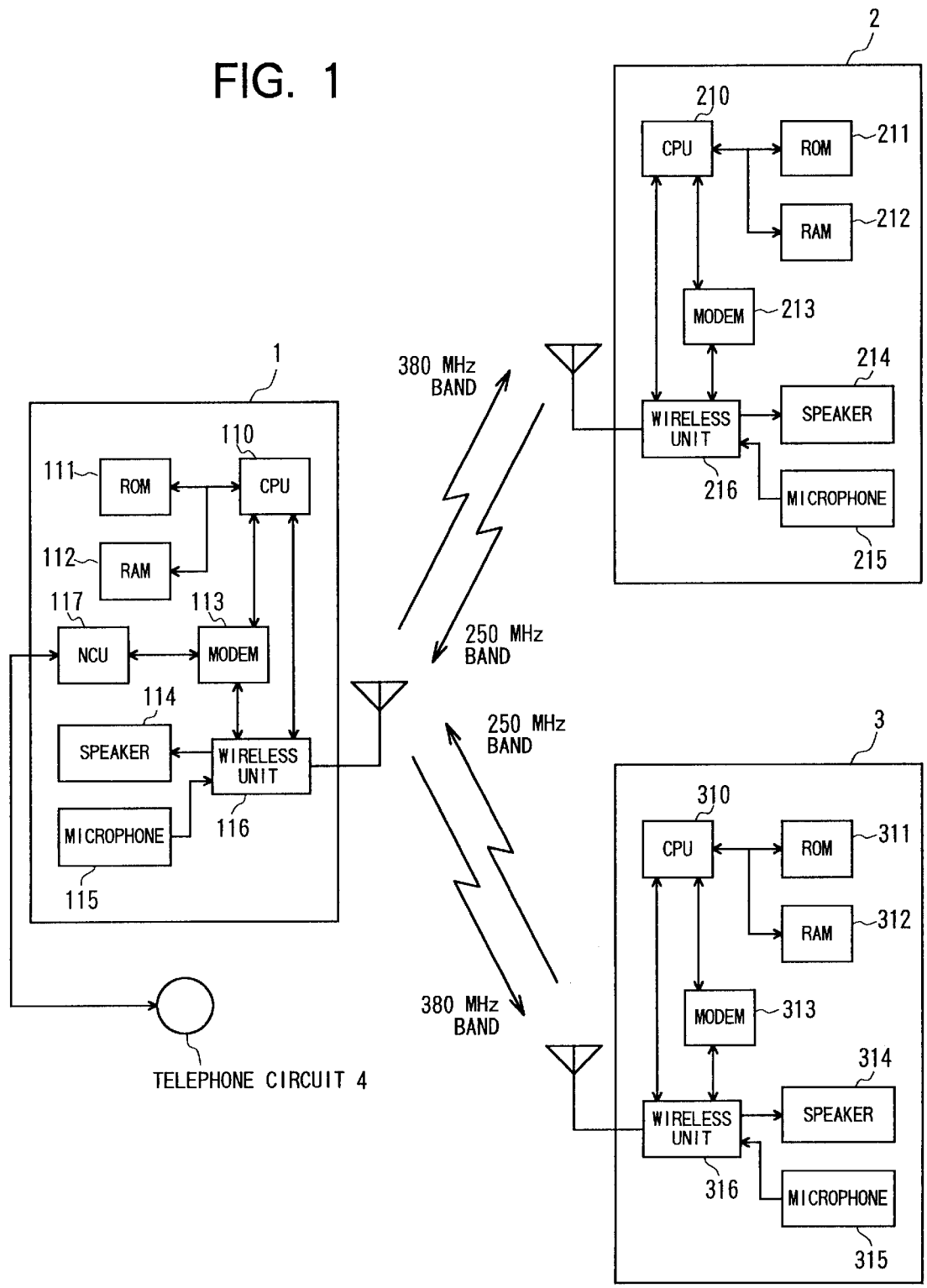
FIG. 1 is a block diagram showing electrical configuration of a wireless transmission system according to the embodiment of the present invention.

FIG. 1 is a block diagram showing system configuration of the cordless telephone system according to the present embodiment. As shown in FIG. 1, the cordless telephone system of the present embodiment includes a main device 1 and two auxiliary devices 2, 3. The main device 1 is connected to a telephone line 4. The auxiliary devices 2, 3 are connected to the main device 1 using wireless transmission. More than two auxiliary devices can be provided, but only two will be described in the present embodiment to facilitate explanation.

Here, a brief explanation will be provided for electrical configuration of the main device 1. The control system of the main device 1 includes a CPU 110, a ROM 111, and a RAM 112, all connected to each other by a bus line. The CPU 110 is connected to a wireless unit 116 and to a modem 113. The modem 113 is connected to the wireless unit 116 and to a network control unit (NCU) 117. The NCU 117 is connected to the telephone line 4. The wireless unit 116 is connected to a speaker 114 and a microphone 115 of a handset, for example. As shown in FIG. 1, the auxiliary devices 2, 3 have electrical configuration substantially the same as the main device 1, so their detailed explanation will be omitted. To facilitate understanding, like components in the main device 1 and the auxiliary devices 2, 3 are indicated in FIG. 1 by numbering with the same last two digits.

Transmission from the main device 1 to the auxiliary devices 2, 3 is performed over an outgoing frequency band of 380 MHz. That is, the 380 MHz frequency band is used for the transmission frequency of the main device 1 and for the reception frequency of the auxiliary devices 2, 3. On the other hand, transmission from the auxiliary devices 2, 3 to the main device 1 is performed over an incoming frequency band of 250 MHz. That is, the 250 MHz frequency band is used for the transmission frequency of the auxiliary devices 2, 3 and reception frequency of the main device 1. Each frequency band includes 89 wireless channels for a total of 178 channels.

Most of the wireless channels are allotted as communication channels for transmission and reception of audio signals. However, one portion of the wireless channels is allotted as control channels for transmission and reception of control signals. Wireless communication between the main device 1 and the auxiliary devices 2, 3 is first established using the control channels. Then, transmission and reception of audio signals and commands is performed thereafter over two communication channels that have been confirmed as being unused, that is, over one channel of each of the 250 MHz and 380 MHz frequency bands.

First, when the main device 1 receives a signal indicating that a call is incoming over the telephone line, a wireless connection is established, and the main device 1 transmits a call command to each of the auxiliary devices 2, 3, one at the time, over a particular communication channel. When the auxiliary device 2, for example, is picked up, or is otherwise brought into an off-hook condition, the auxiliary device 2 sends an off-hook command to the main device 1. When the main device 1 receives this off-hook command, the main device 1 transmits a connection command to the auxiliary device 2, whereupon the telephone conversation is started using the auxiliary device 2.

A half duplex transmission scheme is used to exchange commands and other data between the main device 1 and the auxiliary devices 2, 3 in data frames, which are groups of data partitioned into frame-like units. To transmit a data frame, a particular communication channel is MSK modulated in accordance with the data frame, and the data frame is transmitted from the main device 1 to the auxiliary devices 2, 3 or from the auxiliary devices 2, 3 to the main device 1. When one of the devices 1, 2, 3 receives a data frame, it extracts required information, such as a command, from the data frame and, based on the required information, determines what needs to be performed. According to the present embodiment, when an incoming telephone call is received, relevant data frames are exchanged between the devices 1, 2, 3 following a set control procedure, wherein three cyclically-repeating time slots are allotted for transmitting certain data frames. Details of this control will be described later.

On the other hand, a full duplex transmission scheme is used to communicate audio signals between the main device 1 and the auxiliary devices 2, 3. For example, when a user has a telephone conversion using the auxiliary device 2, the microphone 215 of the auxiliary device 2 is used to convert the user's voice into an audio signal. The wireless unit 216 of the auxiliary device 2 transmits the audio signal to the main device 1 by modulating the frequency (FM) of the selected communication channel of the 250 MHz band according to the audio signal. The wireless unit 116 of the main device 1 receives the audio signal over the channel and demodulates the audio signal. Then the main device 1 transmits the demodulated signal across the telephone line 4 using the NCU 117. On the other hand, when the main device 1 receives an audio signal over the telephone line 4 and the NCU 117, the wireless unit 116 of the main device 1 transmits the audio signal to the auxiliary device 2 by modulating frequency (FM) of the selected communication channel of the 380 MHz band according to the audio signal. The wireless unit 216 of the auxiliary device 2 receives the audio signal over the communication channel, and demodulates it. Then the auxiliary device 2 outputs the demodulated audio signal as sound using the speaker 214. In this way, audio signals are exchanged using two frequencies and a full duplex mode.

Figure 2:
FIG. 2 is a schematic view showing data areas of a typical data frame transmitted in the system of FIG. 1.

FIG. 2 shows configuration of a typical data frame transmitted by the main device 1 and the auxiliary devices 2, 3. As shown in FIG. 2, each data frame includes ID data, two BCH codes, a auxiliary device number, and transmission data. Each of these items is allotted with a required number of bits.

The ID data indicates a particular number assigned to the cordless telephone system and is different for each different cordless telephone system. The main device 1 and the auxiliary devices 2, 3 analyze the ID in each data frame they receive, to determine whether a received data frame was transmitted from the same cordless telephone system. In this way, the ID data enables the main device 1 and the auxiliary devices 2, 3 to accurately recognize data frames from the same system, even if a plurality of cordless telephone systems are operating in the same service area.

The auxiliary device number is for distinguishing between different auxiliary devices of the cordless telephone system. In data frames transmitted from the main device 1 to the auxiliary device 2, 3, the auxiliary device number indicates which auxiliary device is to receive the data frame. In data frames transmitted from the auxiliary device 2, 3 to the main device 1, the auxiliary number indicates which auxiliary device transmitted the data frame. Although the system shown in FIG. 1 includes only two auxiliary devices 2, 3, more auxiliary devices can be connected to the system. Therefore, the auxiliary number portion of the data frame must be allotted a number of bits that enables distinction between all auxiliary device when the maximum number of auxiliary devices are connected to the system.

The transmission data represents the actual information to be transmitted. There are various types of transmission data, such as commands and status. The status indicate a variety of conditions of the system. Examples of commands include a call command, a ready command, and an off-hook command. The call command is transmitted from the main device 1 to the auxiliary devices 2, 3, and indicates that an incoming message has been received over the telephone line. The ready command is transmitted from the auxiliary devices 2, 3, and indicates to device of other telephone systems, which call channel the present system is presently using. The off-hook command is transmitted from the auxiliary devices 2, 3 to the main device 1 in response to a call command from the main device 1, in order to indicate that the transmitting auxiliary device is presently in an off-hook condition, and to request that the main device 1 transmit a connection signal. It should be noted that a code indicating the type of transmission data can also be appended to the lead end of the transmission data.

BCH codes are transmitted in succession both after the ID data command and after the transmission data. Each BCH code is appended to the data frame for correcting errors that can occur when retrieving the data frame, such as errors due to noise relating to wireless transmission. Correction is performed for the ID portion separately from the other portions. The more bits allotted for the BCH code, the greater the correction effect. On the other hand, the fewer bits allotted for the BCH code, the faster processes can be performed. According to the present embodiment, each BCH code is allotted with an number of bits appropriate for striking a good balance with the overall bit allocation.

Although the number of bits allotted to each element of the data frame is fairly flexible to meet needs of the respective elements, the total number of bits in the entire data frame is normally set to a fixed value. Because the same circuitry for transmitting audio signals is used for exchange of data packets, the data packet signals must be transmitted within the range of 300 Hz to 3 kHz, which is the normal range of audio signals. Therefore, MSK modulation must be performed at a modulation speed of about 1200 to 2400 bps. Because the modulation speed is fixed to either 1200 bps or 2400 bps, the time width of each data frame can be maintained at a fixed value. This facilitates allotment of data frames to time slots when transmitting data. Here, while referring to FIGS. 3 and 4, processes will be explained for exchanging data frames between the main device 1 and the auxiliary devices 2, 3 when a telephone call is received over the telephone line 4.

As mentioned previously, when the main device 1 calls the auxiliary devices 2, 3, different data frames are transmitted during allotted ones of three time slots, that is, a first time slot, a second time slot, and a third time slot, which are repeated cyclically in this order.

The first time slot is allotted for transmission of data frames from the main device 1 to the auxiliary devices 2, 3. For example, during the first time slot, the main device 1 can transmit a call frame, which is a data frame that includes a call command as transmission data, or a connect frame, which is a data frame that includes a connection command as transmission data. The second time slot is allotted for transmission of a ready frame from one or both of the auxiliary devices 2, 3. A ready frame is a data frame that includes a ready command as transmission data. The third time slot is allotted for transmission of an off-hook frame from one or both of the auxiliary devices 2, 3 to the main device 1. An off-hook frame is a data frame that includes an off-hook command as transmission data.

As mentioned previously, all data frames have the same fixed time width. In correspondence with this, all time slots have the same time width Ts. The time width Ts includes time required to transmit the actual data frame, and also a margin of time required to start up circuitry and obtain a stable frequency used in wireless transmission.

Figure 3:
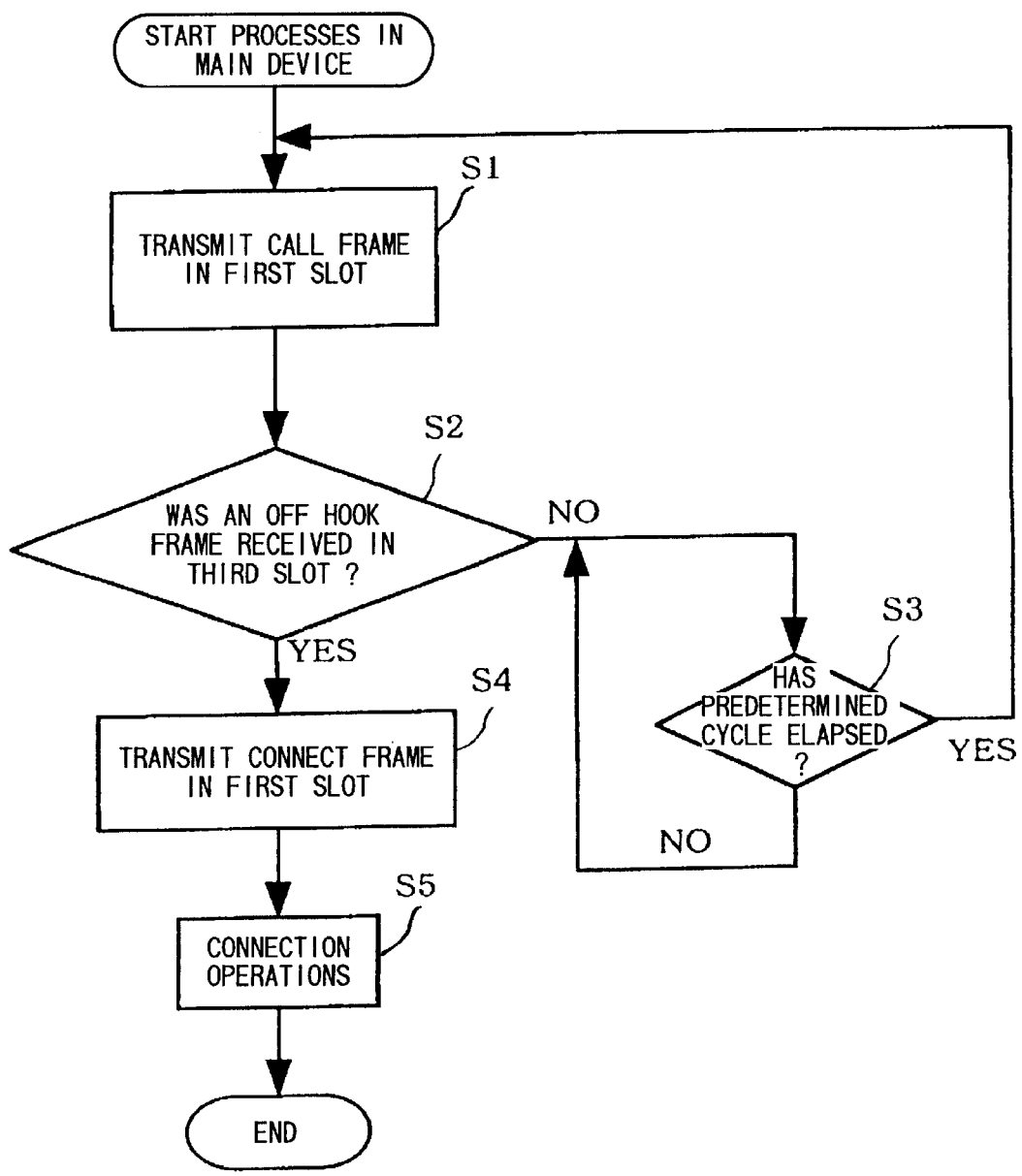
FIG. 3 is a flowchart showing processes performed by a main device of the system, relating to exchange of data frames performed after an incoming telephone call is received.

FIG. 3 is a flowchart showing processes performed in the main device 1, when the main device 1 receives a signal indicating that a telephone call is incoming over the telephone line 4, and so transmits a call command to both of the auxiliary devices 2, 3, and receives an off-hook command from the auxiliary devices 2, 3.

As shown in FIG. 3, when the main device 1 detects an incoming telephone call, then in S1, the main device 1 transmits the call frame to the auxiliary devices 2, 3 in a first time slot. In S2, the main device 1 judges whether or not it has received an off-hook frame from either of the auxiliary devices 2, 3 in the third time slot, in response to the call frame transmitted in S1. If no off-hook frame has been received (S2:NO), then the program proceeds to S3. If an off-hook frame has been received (S2:YES), then the program proceeds to S4.

As mentioned above, the ready command is allotted to the second time slot, so the main device 1 need not perform reception processes during the second time slot when there is no need for the main device 1 to recognize the ready frame. However, as will be described later, the ready frame can include distinction data that identifies which auxiliary device 2, 3 transmitted the ready frame. The main device 1 can receive the ready frame during the slot 2 when there is a need to identify which auxiliary device 2 or 3 transmitted the ready frame.

In S3, the main device 1 judges whether a single cycle T, from the first time slot to the third time slot, has elapsed since the start of the first time slot where the call frame was transmitted in Si. Each cycle T includes three times slots and so is equal to three times the time width 3Ts. When it is judged that the cycle T has elapsed from start of the first time slot (S3:YES), then the program returns to S1. On the other hand, when it is judged that the cycle T has not elapsed (S3:NO), then the program waits in S3 for the cycle T to elapse.

When an off-hook frame is received in response to the call frame (S2:YES), then in S4, the main device 1 transmits a connect frame to the auxiliary device 2 or 3 which is in the off-hook condition. The main device 1 transmits the connect frame in the first time slot of the cycle following the cycle in which the off-hook frame was received in S2. As a result, the off-hook auxiliary device 2, 3 is given permission to connect with the telephone line 4, so that a telephone call can be started.

It should be noted that the call frame can be designed to include designation data that designates which of the auxiliary device 2 or 3 should transmit the ready frame. In this case, regardless of how many auxiliary devices are included in the system, the main device 1 can designate a particular auxiliary device using the designation data so that the auxiliary device transmits the ready frame. Alternatively, the main device 1 can designate a certain number of the auxiliary devices to transmit the ready frame. For example, if the system includes N auxiliary devices, then the main device can designate M auxiliary devices to transmit the ready frame, wherein M is less than N. When the call frame includes designation data in this manner, after the auxiliary devices 2, 3 receive the call frame, the auxiliary devices 2, 3 analyze the designation data and determine whether or not they have been designated to transmit the ready frame.

Figure 4:
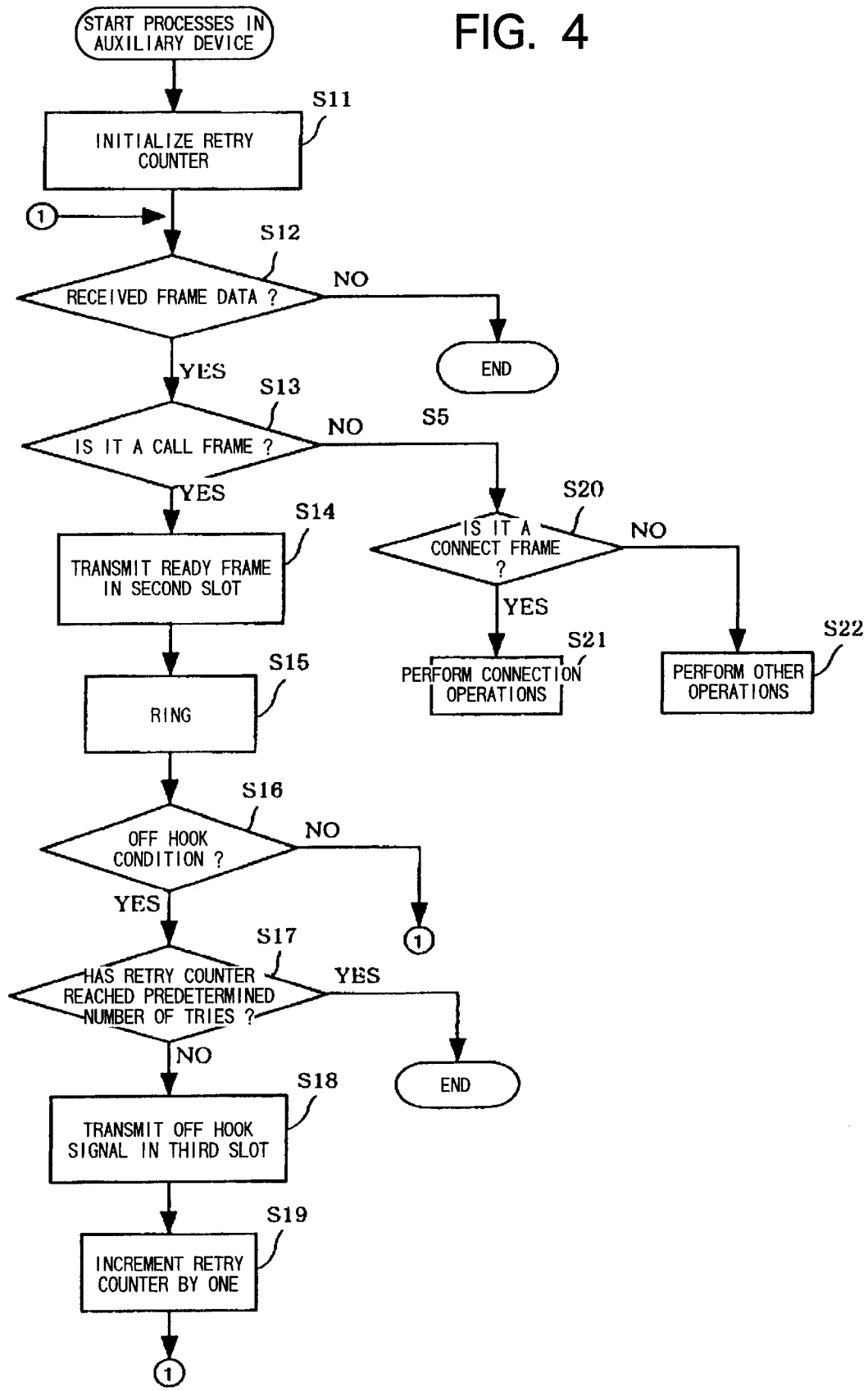
FIG. 4 is a flowchart showing processes performed by a auxiliary devices of the system, relating to exchange of data frames.

Next, FIG. 4 is a flowchart representing processes performed in the auxiliary device 2 corresponding to processes of the main device 1 represented in FIG. 3. In the example shown in FIG. 4, the auxiliary device 2 is designated to transmit the ready frame.

When the routine shown in FIG. 4 is started in the auxiliary device 2, first a retry counter is initialized in S11. The retry counter is for counting the number of times the auxiliary device retransmits the off-hook frame in the third time slot of how many consecutive cycles. Because there is a possibility that both the auxiliary devices 2, 3 might transmit off-hook frames simultaneously in the same third time slot, the auxiliary devices 2, 3 are each set with different retry numbers. Because the auxiliary devices 2, 3 have different retry times, even if they each transmit a first off-hook frame in the same third time slot, the auxiliary device set with a larger retry number will be able to properly transmit an off-hook frame after the other auxiliary device is no longer capable of transmitting an off-hook frame. For this reason, the number of retries are constantly counted using the retry counter. The count of the retry counter is initially set to zero in S11.

In S12, the auxiliary device 2 judges whether or not it has received a data frame from the main device 1. When the auxiliary device 2 receives a data frame directly after it first starts operating, it can not yet properly grasp the timing of the first through third time slots of the cycle T because the devices 1, 2, and 3 are not yet in synchronization. For the purpose of achieving synchronization with the child devices 2, 3, the main device 1 transmits a frame synchronizing signal with each call signal. The auxiliary devices 2, 3 each start a timer whenever they receive a frame synchronizing signal. Then to grasp the timing of the cycle T, the auxiliary devices 2, 3 must continuously receive the data frame for the entire cycle T. As a result, when the auxiliary device 2 has not received data frame (S12:NO), then the processes are ended. However, when the auxiliary device 2 receives a data frame (S12:YES), then the routine proceeds to S13.

In S13, the auxiliary device 2 judges whether or not the received data frame is a call frame or not. When the auxiliary device 2 judges that the data frame is a call frame (S13:YES), then the routine proceeds to S14. When the auxiliary device 2 judges that the data frame is not a call frame (S13:NO), then the routine proceeds to S20.

In S14, the auxiliary device 2 transmits a ready frame, that is, during the second time slot directly following the first time slot that included the call frame detected in S13. As a result, the auxiliary device 2 outputs a transmission radio wave that corresponds to the selected communication channel in the 250 MHz band. This radio wave notifies the main device of other cordless telephone systems that the selected communication channel is being used.

In S15, the auxiliary device 2 rings in response to the call frame from the main device 1, thereby notifying a user in the vicinity of the auxiliary device 2 that a telephone call is incoming.

In S16, the auxiliary device 2 judges whether it, that is, the auxiliary device 2 itself, has been brought into an off-hook condition. The auxiliary device 2 detects that it is in an off-hook condition, for example, if the user performs predetermined operations for making a telephone call, such as when the user switches on a certain switch, presses a certain button, or merely lifts up a handset of the auxiliary device 2. When the auxiliary device 2 determines that it is in an off-hook condition (S16:YES), then the program proceeds to S17. On the other hand, when the auxiliary device 2 determines that it is not in an off-hook condition (S16:NO), then the routine returns to S12.

Once the auxiliary device 2 is in an off-hook condition (S16:YES), then the auxiliary device 2 must request a connection from the main device 1. However, beforehand, in S17 the auxiliary device 2 judges whether or not the retry counter has reached the above-described preset number of retries. When the retry counter has reached the number of retries (S17:YES), then processes are ended here because the auxiliary device 2 can transmit no further off-hook frames. On the other hand, when the retry counter has not reached the predetermined number of retries (S17:NO), then the routine proceeds to S18.

In S18, the auxiliary device 2 transmits the above-described off-hook frame during the slot 3, which follows the time slot 2, thereby notifying the main device 1 that it requests to answer the incoming call.

In S19, the retry counter is incremented by one. In other words, the single off-set frame that was transmitted in S18 is counted in S19.

When no call frame is detected in S13 (S13:NO), the routine proceeds to S20, where it is judged whether or not the data frame received in S12 is a connect frame. If it is judged that the data frame is a connect frame (S20:YES), then the routine proceeds to S21. When it is judged that the received data frame is not a connect frame (S20:NO), then the routine proceeds to S22.

When the auxiliary device 2 receives permission from the main device 1 to make a connection (S20:YES), then in S21, the auxiliary device 2 performs operations for connecting to the telephone line. As a result, the present call channel is used to perform communication between the auxiliary device 2 and the remote device, such as another telephone, which is connected to the main device 1 through the telephone line 4.

When the data frame received in S12 is neither a call frame or connect frame (S20:NO), then in S22 the data frame is analyzed, and operations are performed according to the analyzed data frame.

It should be noted that the ready frame transmitted in the second time slot need not have the data configuration shown in FIG. 2. A non-modulated carrier can be used instead if the ready frame is merely for notifying other cordless telephone systems that a certain communication channel is being used by the present system. However, if the ready frame has a data configuration with other data besides the ready command, then notification of the communication channel being used can be performed in association with notifying the main device 1 of the operating condition of the auxiliary device 2.

The system according to the present invention can be designed so that both the auxiliary devices 2, 3 transmit the ready frame simultaneously in the second time slot. However, in this case the ready frames transmitted from the auxiliary devices 2, 3 will collide with each other, so the content of data in the ready frame will be difficult to properly recognize. On the other hand, this configuration more reliably notifies other telephone systems of the communication channel being used, because even when power of one of the auxiliary devices 2, 3 is turned off, the other auxiliary device will transmit the ready frame.

Also the system can be designed so that any number of auxiliary devices in the telephone system transmit the ready signal. For example, assuming that R is less than N, then when the cordless telephone system includes N auxiliary devices, R auxiliary devices of the N auxiliary devices that are capable of transmission can transmit the ready frame simultaneously during the second time slot.

Alternatively, the system can be designed so that the auxiliary devices 2, 3 alternate which device is to transmit the ready frame during the second time slot. In this case, if the auxiliary devices 2, 3 are disposed in different locations, then the ready frame can be transmitted over a greater area.

The ready frame can include identification data indicating which auxiliary device 2 or 3 transmitted the ready frame. With this configuration, the main device 1 can judge which auxiliary device transmitted the ready frame, so that the main device 1 can judge the operating condition of a particular auxiliary device. When the ready frame includes identification data, the main device 1 can analyze the identification data after receiving the ready frame and judge which auxiliary device transmitted the ready frame.

Next, timing of transmission and reception of the data frame when the main device 1 transmits a call signal to the auxiliary devices 2, 3 will be explained while referring to FIGS. 5 through 7. In the following explanation also, it is assumed that the auxiliary device 2 serves to transmit the ready frame.

Figure 5:
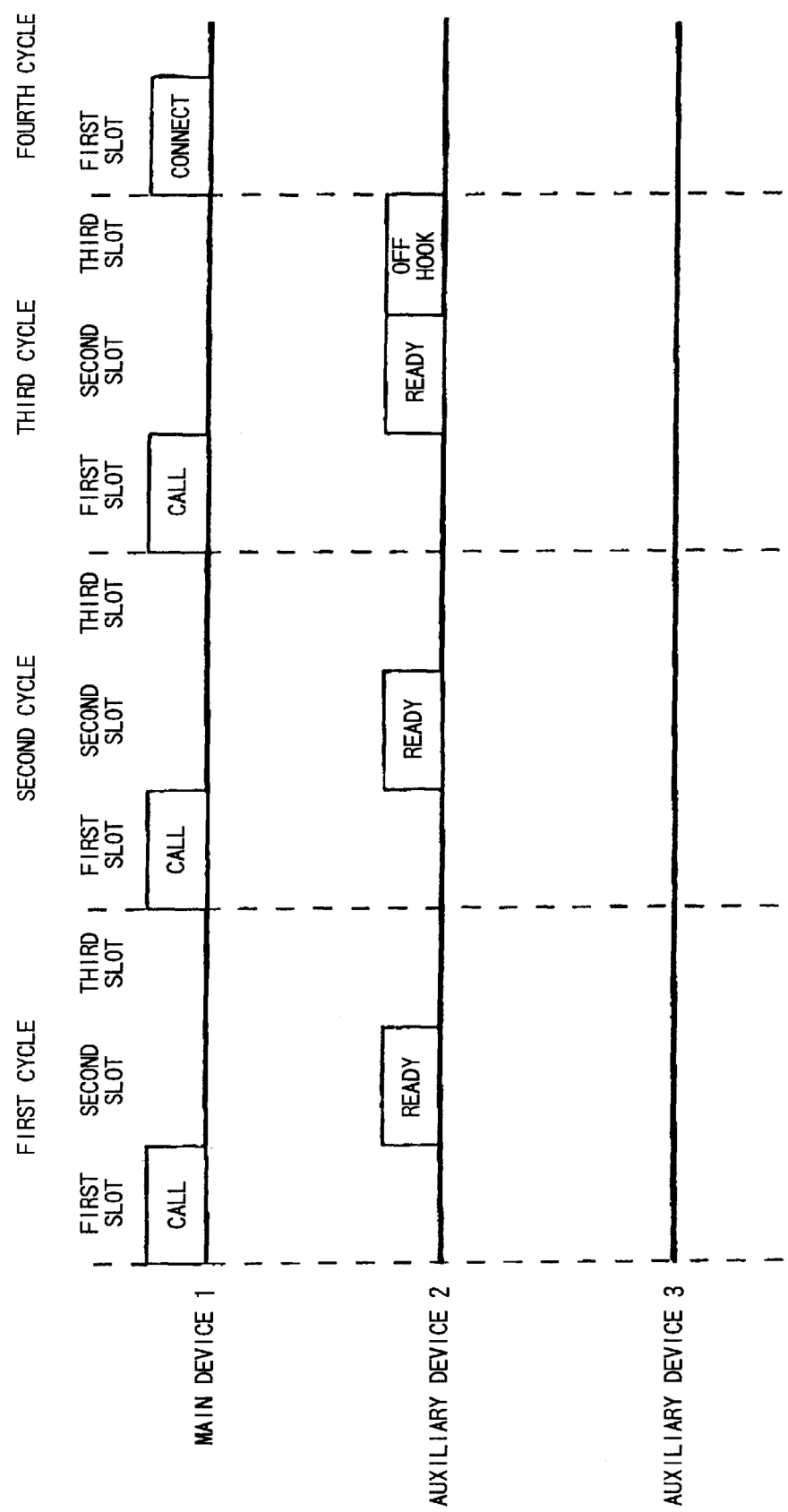
FIG. 5 is a timing chart showing timing of data frame exchange between the auxiliary device and the main device, when the same auxiliary device transmits both a ready frame and an off-hook frame.

FIG. 5 is a timing chart showing a situation wherein the main device 1 transmits a call frame to the auxiliary devices 2, 3 and the auxiliary device 2 transmits a call frame and an off-hook frame. In FIG. 5, the timing chart is partitioned into three-slot cycles T, wherein the first, second, third, and fourth cycles are labeled in this order starting from the left-end side of the chart.

As shown in FIG. 5, during the first cycle, the main device 1 transmits a call frame during slot 1. The auxiliary device 2 transmits the ready frame during the slot 2. Since neither auxiliary device 2 or 3 has yet entered an off-hook condition, no off-hook frame is transmitted in the third time slot. The same pattern of transmission is repeated in the second cycle.

In the third cycle, after the main device 1 transmits a call frame in the first time slot and the auxiliary device 2 transmits a ready frame in the second time slot, the auxiliary device 2 transmits an off-hook frame in the third time slot. That is to say, at some point between the third time slot of the second cycle and the second time slot of the third cycle, the user performed predetermined operations at the auxiliary device 2 to put the auxiliary device 2 into an off-hook condition, so that the auxiliary device 2 detected in S16 that it has entered an off-hook condition.

During the fourth cycle, the main device 1, which has received the off-hook frame from the auxiliary device 2, transmits a connect frame to the auxiliary device 2 in the first time slot of the fourth cycle. Afterward, when the auxiliary device 2 receives the connect frame, then connection operations are performed so that the auxiliary device 2 is able to perform telephone communication. In an example shown in FIG. 5, the auxiliary device 3 transmits no data frames. Only the auxiliary device 2 transmits the ready frame and the off-hook frame.

Figure 6:
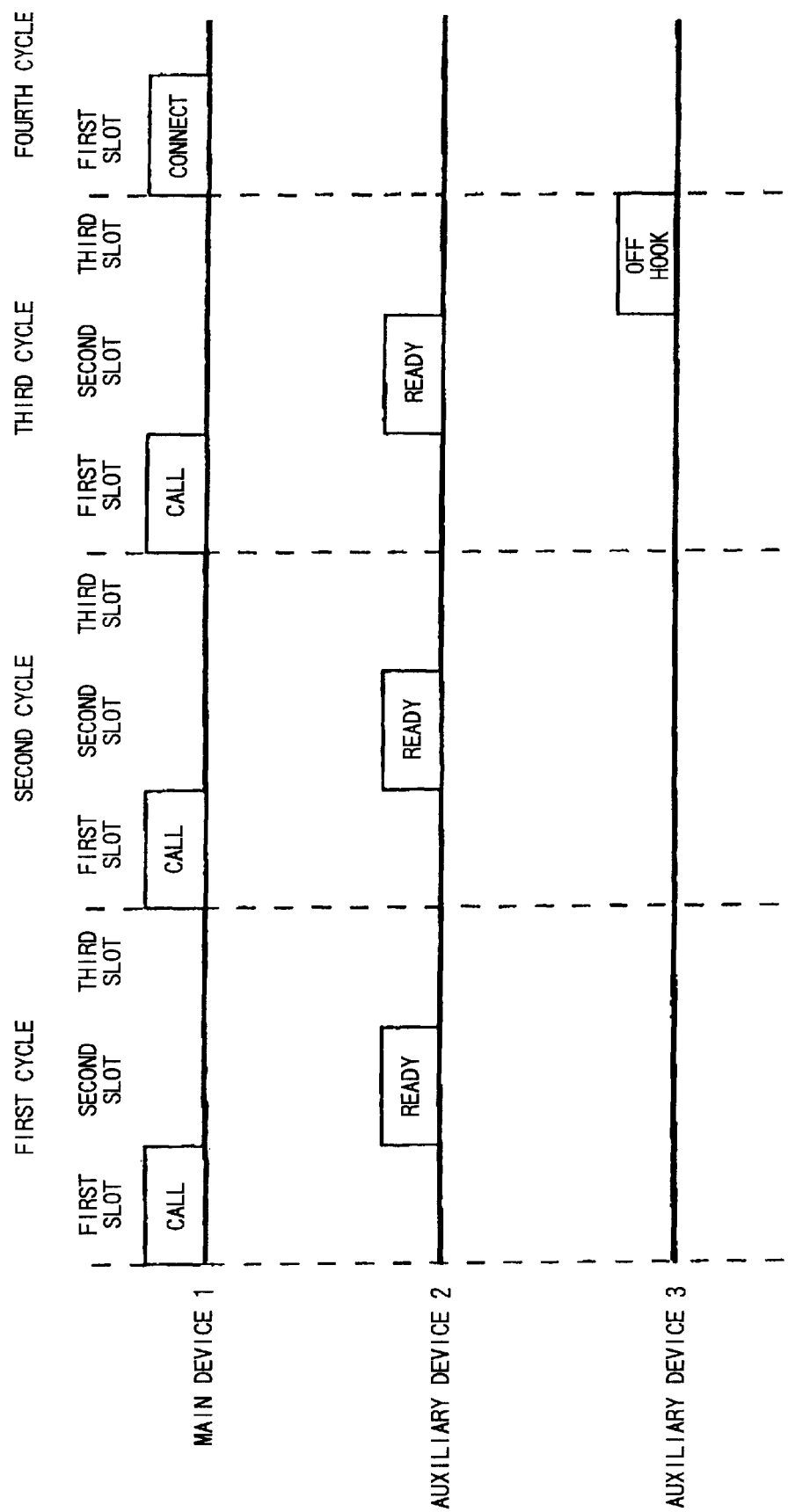
FIG. 6 is a timing chart showing timing of data frame exchange between the auxiliary device and the main device, when different auxiliary devices transmit the ready frame and an off-hook frame.

Next, FIG. 6 is a timing chart showing the situation wherein the main device 1 transmits a call frame to the auxiliary devices 2, 3, the auxiliary device 2 transmits the ready frame, and the auxiliary device 3 transmits an off-hook frame. Operations of the first and the second cycles in FIG. 3 are the same as in FIG. 5, so their explanations will be omitted.

During the third cycle, however, after the main device 1 transmits the call frame in the first time slot, and the auxiliary device 2 transmits the ready frame in the second time slot, and in succession after this, the auxiliary device 3 transmits the off-hook frame in the third time slot. That is, the auxiliary device 3 detected an off-hook condition at some point from the third time slot of the second cycle to the second time slot of the third cycle.

After the main device 1 receives the off-hook from the auxiliary device 3 in the third cycle, then in the fourth cycle, the main device 1 transmits a connect frame in the first time slot to the auxiliary device 3. When the auxiliary device 3 receives the connect frame, it performs connection operations to enable a telephone communication. In this way, FIG. 6 shows an example wherein the auxiliary device 2 transmits the ready frame and the auxiliary device 3 transmits the off-hook frame.

According to the embodiment, regardless of how many auxiliary devices are registered to communicate with the main device 1, the second and third time slots are shared, that is, used commonly, by all auxiliary devices to transmit data frames. For this reason, the cycle T of the data frame is fixed regardless of the number of auxiliary devices, so that connection can be swiftly performed.

Often the auxiliary devices 2, 3 will not be brought into an off-hook condition, or only be brought into an off-hook condition after the main device 1 has transmitted a great number of call signals. However, because the auxiliary devices 2, 3 share the same communication channel and the same time slots, they can not continuously output transmission radio waves. When the auxiliary devices 2, 3 do not output any transmission radio waves over the incoming frequency of the communication channel for a long period of time, the main device 1 of another cordless telephone system in the same service area is likely to. erroneously judge that the communication channel which the auxiliary devices 2, 3 are supposed to be using is a free channel.

To prevent this from happening, according to the present embodiment, one or more auxiliary devices transmit the ready frame to notify the main device of other cordless telephone systems that the communication channel is presently being used, regardless of whether any of the auxiliary devices enter an off-hook condition and transmit an off-hook signal. With this configuration, the possibility is greatly silo reduced that the main device of another cordless telephone system will erroneously judge that the communication channel is a free channel.

Figure 7:
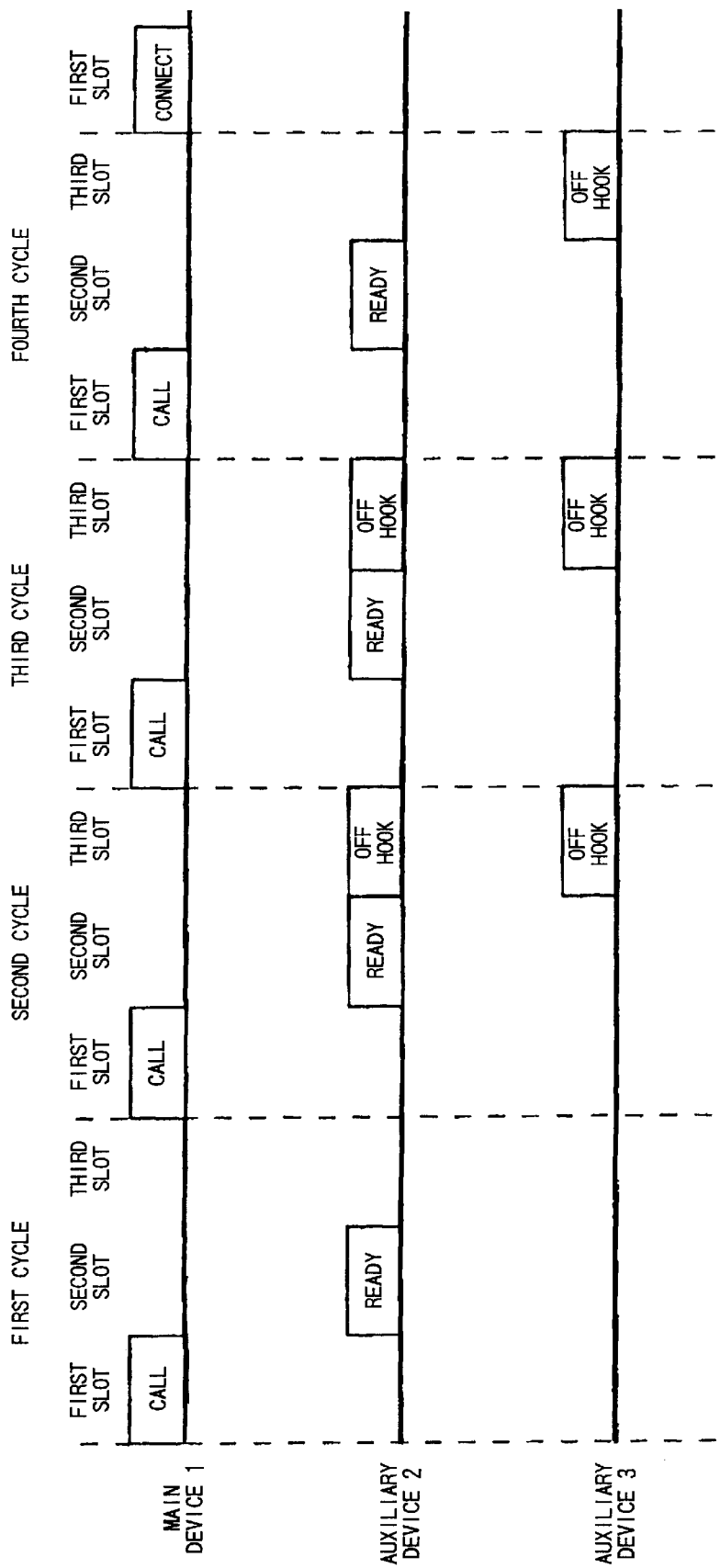
FIG. 7 is a timing chart showing timing of data frame exchange between the auxiliary device and the main device, when the two auxiliary devices both transmit an off-hook frame at the same timing.

Next, FIG. 7 is a timing chart indicating the situation wherein both the auxiliary devices 2, 3 transmit an off-hook frame at the same timing for a call signal from the main device 1, so that the off-hook frames from the auxiliary devices 2, 3 collide with each other.

As shown in FIG. 7, both the auxiliary devices 2, 3 transmit off-hook frames during the third time slot of the second cycle. Because the transmitted radio waves from the auxiliary devices 2, 3 collide with each other, the main device 1 will not be able to accurately detect whether the transmitted radio waves are off-hook frames, that is, assuming that the main device 1 even receives the transmitted radio waves of the off-hook frames.

To insure that this type of situation can be properly handled, as described above the auxiliary devices 2, 3 are set with different retry numbers. Specifically, in the present example the auxiliary device 2 is set with a retry number of one and the auxiliary device 3 is set with a retry number of two. Accordingly, during the third cycle, both the auxiliary devices 2, 3 resend an off-hook frame, but the main device 1 will be unable to accurately detect the off-hook frames in the same manner as in the second cycle.

However, during the fourth cycle, the auxiliary device 2 will not resend an off-hook frame because it has already reached its retry number. On the other hand, the auxiliary device 3 still has a single retry left, so the auxiliary device 3 resends the off-hook frame during the slot 3 of the fourth cycle. Because of this, the main device 1 receives an off-hook frame from only the auxiliary device 3, and so can properly detect the off-hook frame. Afterwards, the auxiliary device 3 connects to the telephone line in the same manner as described with reference to FIGS. 4, 5, and 6.

The above-described configuration can be applied to a cordless telephone system with more than two auxiliary devices. For example, when N auxiliary devices are provided, each of the auxiliary devices can be set with a different retry number from one to N, so that all of the auxiliary devices are set with different retry numbers. In this case also, even if a certain combination of the plurality of auxiliary devices transmit off-hook frames at the same timing, in the end, an off-hook frame from only one of the auxiliary devices will be received by the main device 1.

As mentioned above, after a auxiliary device transmits an off-hook frame, the auxiliary device may fail to receive a connect frame from the main device 1 because the initially sent off-hook frame collided with a frame from another auxiliary device, so the main device did not receive it. In such a situation, there is a chance that the off-hook frames will collide again if merely retransmitted. To prevent such a potential problem, the embodiment described the auxiliary devices 2, 3 as being set with different retry numbers. However, this potential problem can also be prevented by basing the determination of whether the auxiliary devices 2, 3 resend the off-hook frame based on probability independently in each cycle.

That is to say, when both of the auxiliary devices 2, 3 transmit an off-hook frame at the same time, so that the radio waves collide, then the auxiliary devices 2, 3 separately determine whether or not to resend an off-hook frame in the next cycle at a probability of fifty percent, based on, for example, a random number. When two auxiliary devices transmit off-hook frames, but receive no connect frames, then each generates a random number between 0 and 1. Each auxiliary device will retransmit the off-hook frame if the generated random number is greater than 0.5, but will not retransmit if the random number is 0.5 or less.

The ROM 211, 311 of the auxiliary devices 2, 3 store a program for performing this operation. FIG. 8 is a flowchart representing processes performed by the CPUs 210, 310 according to the program. When a auxiliary device does not receive a connect frame in response to an off-hook frame, then in S31 the auxiliary device generates a random number from 0 to 1. Next, in S32, the auxiliary device judges whether the random number is greater than or equal to 0.5. If not (S32:NO), then the routine returns to the main program. If so (S32:YES), then in S33 the auxiliary device retransmits the off-hook frame.

With this configuration, there is a 50% probability that one of the auxiliary devices will successfully connect with the main device. This probability will remain the same for each retry. For example, if a first retry is unsuccessful, the probability that a second retry will be successful will still be 50%. It is unlikely that both of the auxiliary devices will remain unconnected with the main device for a long period of time. That is, the probability that a condition wherein both the auxiliary devices 2, 3 will be incapable of connecting will continue for a long period of time greatly reduces in association with the increased number of retries. This modification of the embodiment is especially beneficial when many auxiliary devices are provided in the system, because the average time required before connection is shorter than when each auxiliary device is set with a different number of retries.

The embodiment described the present invention applied to an analog cordless telephone system. However, the present invention is not limited to application to analog cordless telephone systems. The present invention can be applied to any wireless transmission system that uses a half duplex communication scheme to receive transmitted predetermined data after establishing wireless connection between a main device and auxiliary devices using multiple access.

What is claimed is:

1. A wireless transmission system comprising:
a main device and a plurality of auxiliary devices that communicate data therebetween using a multiple access transmission scheme, wherein the main device transmits to the plurality of auxiliary devices over an outgoing frequency of a single wireless channel, the plurality of auxiliary devices transmit to the main device over an incoming frequency of the single wireless channel, and the main device and the plurality of auxiliary devices communicate in time slots that repeat in cycles, each cycle including:
a first time slot allotted for the main device to transmit a call signal to the plurality of auxiliary devices;

a second time slot allotted for at least one of the plurality of auxiliary devices to transmit a notification signal notifying that the single wireless channel is presently being used; and a third time slot allotted for any of the plurality of auxiliary devices to transmit a response signal resending to the call signal from the main device.

2. A wireless transmission system as claimed in claim 1, wherein all of the plurality of auxiliary devices that are capable of transmission transmit the notification signal in the second time slot of each cycle.

3. A wireless transmission system as claimed in claim 1, wherein:

the main device transmits the call signal with designation data that designates which of the auxiliary devices should transmit the notification signal; and each of the plurality of auxiliary devices includes a distinguishing unit that determines whether the designation data designates the corresponding auxiliary device or not.

4. A wireless transmission system as claimed in claim 1, wherein:

the at least one of the plurality of auxiliary devices transmits the notification signal with distinguishing data that indicates the at least one of the plurality of auxiliary devices as transmitting the notification signal; and the main device includes a distinguishing unit that determines which auxiliary device is indicated by the distinguishing data.

5. A wireless transmission system as claimed in claim 1, wherein the at least one of the plurality of auxiliary devices transmits the notification signal in the form of an unmodulated carrier corresponding to the incoming frequency of the single wireless channel.

6. A wireless transmission system as claimed in claim 1, wherein each of the plurality of auxiliary devices is set with a different retry number indicating a number of consecutive cycles the corresponding auxiliary device is to retry to transmit the response signal in the third time slot.

7. A wireless transmission system as claimed in claim 1, wherein each auxiliary device includes a retry determination unit that determines, based on a predetermined probability, whether to retry transmitting the response signal, each auxiliary device retransmitting a response signal in the third time slot subsequent to the third time slit wherein the response signal was first transmitted only when the corresponding retry determination unit determines to retry transmitting the response signal.

8. A wireless transmission system as claimed in claim 1, wherein the wireless transmission system is a cordless transmission system connected to a telephone line.

9. A wireless transmission system comprising:

a main device;

a plurality of auxiliary devices, the main device and the plurality of auxiliary devices communicating data using a multiple access transmission scheme, the main device transmitting to the plurality of auxiliary devices over an outgoing frequency of a single wireless channel, the plurality of auxiliary devices transmitting to the main device over an incoming frequency of the single wireless channel; and a timing controller for controlling the main device and the plurality of auxiliary devices to communicate using multiple access based on repeating time-slot cycles, the timing controller controlling in each time-slot cycle:

the main device to transmit a call signal to the plurality of auxiliary devices in a first time slot;

at least one of the plurality of auxiliary devices to transmit in a second time slot a notification signal notifying that the single wireless channel is presently being used; and any of the plurality of auxiliary devices that are in an off-hook condition to transmit in a third time slot an off-hook signal to the main device.

10. A wireless transmission system as claimed in claim 9, wherein the timing controller controls all the auxiliary devices to transmit the notification signal in the second time slot of each time-slot cycle.

11. A wireless transmission system as claimed in claim 9, wherein:

the main device includes designation data in the call signal, the designation data designating which auxiliary device should transmit the notification signal; and each auxiliary device includes a distinguishing unit that determines whether the designation data of call signals received from the main device designates the corresponding auxiliary device.

12. A wireless transmission system as claimed in claim 9, wherein:

the at least one of the plurality of auxiliary devices includes distinguishing data in the notification signal, the distinguishing data indicating that the at least one of the plurality of auxiliary devices is transmitting the notification signal; and the main device includes a distinguishing unit that determines which auxiliary device is indicated by distinguishing data in notification signals received from the at least one of the plurality of auxiliary devices.

13. A wireless transmission system as claimed in claim 9, wherein the at least one of the plurality of auxiliary devices transmits the notification signal in the form of an unmodulated carrier corresponding to the incoming frequency of the single wireless channel.

14. A wireless transmission system as claimed in claim 9, wherein the plurality of auxiliary devices includes a first and second auxiliary devices:

the first auxiliary device including:

a first-auxiliary device memory storing a retry number that corresponds to the first auxiliary device; and a first-auxiliary device retry unit that repeatedly operates to resend the response signal in the third time slot of consecutive time-slot cycles, until either a response is received from the main device or the first-auxiliary device retry unit operates to resend the response signal in a number of consecutive time-slot cycles corresponding to the retry number stored in the first-auxiliary device memory; the second auxiliary device including:

a second-auxiliary device memory storing a retry number that corresponds to the second auxiliary device and that differs from the retry number stored in the first-auxiliary device memory; and a second-auxiliary device retry unit that repeatedly operates to resend the response signal in the third time slot of consecutive time-slot cycles, until either a response is received from the main device or the second-auxiliary device retry unit operates to resend the response signal in a number of consecutive time-slot cycles corresponding to the retry number stored in the second-auxiliary device memory.

15. A wireless transmission system as claimed in claim 9, wherein each auxiliary devices includes a retry determination unit that determines, based on a predetermined probability, whether to retry transmitting a response signal, each auxiliary device retransmitting a response signal in the third time slot subsequent to the third time slit wherein the response signal was first transmitted, only when the corresponding retry determination unit determines to retry transmitting the response signal.

16. A wireless transmission system comprising:
- a main device;
- a plurality of auxiliary devices; and
- a multiple access synchronizer for synchronizing communication of data between the main device and the plurality of auxiliary devices using a multiple access transmission scheme wherein data is exchanged in fixed-width time slots during repeating time-slot cycles, the multiple access synchronizer allotting in each time-slot cycle:
  - a first time slot to the main device for transmitting signals to the plurality of auxiliary devices over an outgoing frequency of a single wireless channel;
  - a second time slot to at least one of the plurality of auxiliary devices for transmitting a notification signal notifying that the single wireless channel is presently being used; and
  - a third time slot to the plurality of auxiliary devices for transmitting signals to the main device over an incoming frequency of the single wireless channel.

* * * * *